(12) United States Patent
Sato et al.

(10) Patent No.: US 9,793,015 B2
(45) Date of Patent: Oct. 17, 2017

(54) CONTAINMENT VESSEL AND NUCLEAR POWER PLANT THEREWITH

(75) Inventors: Takashi Sato, Kanagawa (JP);
Junichiro Otonari, Kanagawa (JP);
Yasunobu Fujiki, Kanagawa (JP);
Takuya Miyagawa, Tokyo (JP); Hisaki Sato, Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 1445 days.

(21) Appl. No.: 12/338,559

(22) Filed: Dec. 18, 2008

(65) Prior Publication Data
US 2009/0323884 A1 Dec. 31, 2009

(30) Foreign Application Priority Data
Dec. 21, 2007 (JP) .................................. 2007-330918

(51) Int. Cl.
*G21C 15/18* (2006.01)
*G21C 13/00* (2006.01)
*G21C 9/004* (2006.01)

(52) U.S. Cl.
CPC ............. *G21C 15/18* (2013.01); *G21C 13/00* (2013.01); *G21C 9/004* (2013.01);
(Continued)

(58) Field of Classification Search
CPC ........... G21Y 2002/32; G21Y 2002/50; G21Y 2004/30; G21Y 2004/302;
(Continued)

(56) References Cited

U.S. PATENT DOCUMENTS 3,232,843 A * 2/1966 Went et al. ................... 376/318
3,314,858 A * 4/1967 Villadsen ...................... 376/293
(Continued)

FOREIGN PATENT DOCUMENTS

EP  1 233 424 A1  8/2002
GB  1280400  *  7/1972
(Continued)

OTHER PUBLICATIONS

Sato et al. (Sato et al.; Different Variations of a Passive Safety Containment for a BWR with Active and Passive Safety Systems; Nuclear Engineering and Design 235 (2205) p. 2125-2139).*
(Continued)

*Primary Examiner* — Jack W Keith
*Assistant Examiner* — Daniel Wasil
(74) *Attorney, Agent, or Firm* — Foley & Lardner LLP

(57) ABSTRACT

A containment vessel for containing a reactor pressure vessel, a reactor core, and a steam generator of a pressurized water reactor includes a main body equipped with a polar crane, a diaphragm set above the polar crane that partitions the main body, before and after a loss-of-coolant accident (LOCA), into an upper vessel including a dome part having an open space and a lower vessel isolated from the upper vessel, a pressure suppression chamber including a suppression pool that stores water and a gas phase in communication with the open space, a LOCA vent pipe connecting the suppression pool to the lower vessel, and a vacuum breaker that equalizes pressure by allowing gas flow from the upper to the lower vessel when a pressure difference between the upper and lower vessels exceeds a preset value. The lower vessel contains all equipment and piping constituting a reactor pressure boundary.

14 Claims, 7 Drawing Sheets

(52) U.S. Cl.
CPC .... *G21Y 2002/304* (2013.01); *G21Y 2004/30* (2013.01); *Y02E 30/32* (2013.01)

(58) Field of Classification Search
CPC .. G21Y 2002/207; G21C 15/00; G21C 15/18; G21C 15/22; G21C 19/00; G21C 19/20; G21C 9/00; G21C 9/08; G21C 9/004; G21C 13/04; G21C 13/022; G21C 13/02; G21C 1/086; G21C 13/00; G21C 1/09; G21C 13/087; G21C 13/036; G21C 15/12; G21C 1/322; G21C 13/024; G21C 1/28; Y02E 30/32; Y02E 30/40; G21D 3/04
USPC ....... 376/277, 282, 283, 293, 294, 295, 296, 376/347
See application file for complete search history.

(56) References Cited

U.S. PATENT DOCUMENTS

| | | | |
|---|---|---|---|
| 3,528,884 A * | 9/1970 | Collier | G21C 15/18 376/282 |
| 3,819,476 A * | 6/1974 | Pocock et al. | 376/306 |
| 3,889,707 A * | 6/1975 | Fay et al. | 137/251.1 |
| 4,080,256 A * | 3/1978 | Braun et al. | 376/293 |
| 4,440,719 A * | 4/1984 | Howard | 376/372 |
| 4,610,840 A * | 9/1986 | Leach | G21C 9/012 376/283 |
| 4,797,249 A * | 1/1989 | Schweiger | 376/279 |
| 4,948,554 A * | 8/1990 | Gou et al. | 376/283 |
| 5,011,652 A * | 4/1991 | Tominaga et al. | 376/283 |
| 5,098,646 A * | 3/1992 | Oosterkamp | 376/283 |
| 5,169,596 A | 12/1992 | Orr | |
| 5,217,680 A * | 6/1993 | Koshiishi et al. | 376/282 |
| 5,282,230 A | 1/1994 | Billig et al. | |
| 5,295,168 A * | 3/1994 | Gluntz et al. | 376/283 |
| 5,303,274 A * | 4/1994 | Sawyer | 376/283 |
| 5,491,730 A * | 2/1996 | Kataoka et al. | 376/283 |
| 5,659,591 A * | 8/1997 | Gelbe et al. | 376/282 |
| 5,761,262 A * | 6/1998 | No | G21C 9/012 376/283 |
| 5,872,825 A * | 2/1999 | Eckardt | G21C 9/004 376/283 |
| 5,999,585 A * | 12/1999 | Dehaudt et al. | 376/421 |
| 6,243,432 B1 * | 6/2001 | Cheung et al. | 376/283 |
| 6,795,518 B1 * | 9/2004 | Conway et al. | 376/283 |
| 7,558,360 B1 * | 7/2009 | Gamble et al. | 376/280 |
| 2004/0196948 A1* | 10/2004 | Conway et al. | 376/283 |
| 2007/0092053 A1* | 4/2007 | Sato | 376/283 |

FOREIGN PATENT DOCUMENTS

| | | | |
|---|---|---|---|
| GB | 1 507 688 A | 4/1978 | |
| JP | 57-132085 A | 8/1982 | |
| JP | 64-020493 A | 1/1989 | |
| JP | 08-005772 A | 1/1996 | |
| JP | 2004-085234 A | 3/2004 | |
| JP | 2007-010457 * | 1/2007 | G21C 9/004 |
| WO | WO 02/073625 A2 | 9/2002 | |

OTHER PUBLICATIONS

IAEA (IAEA: Natural Circulation in Water Cooled Nuclear Power Plants; IAEA Tecdoc 1474, Nov. 2005; pp. I-15 and 358-362).*
Schulz et al. (W.E. Cummins, M.M. Corletti, T.L. Schulz; Westinghouse AP1000 Advanced Passive Plant Proceedings of ICAPP '03 Cordoba, Spain, May 4-7, 2003; Paper 3235).*
IAEA-TECDOC-1391, "Status of advanced light water reactor designs 2004," May 2004, pp. 207-231 and 279-306.

* cited by examiner

CONTAINMENT VESSEL AND NUCLEAR POWER PLANT THEREWITH

CROSS REFERENCE TO RELATED APPLICATION

This application is based upon and claims the benefit of priority from the prior Japanese Patent Application No. 2007-330918 filed on Dec. 21, 2007; the entire content of which is incorporated herein by reference.

BACKGROUND OF THE INVENTION

The present invention relates to a containment vessel of a pressurized water reactor and to a nuclear power plant therewith.

Most light water reactors (LWRs) have a safety system such as an emergency core cooling system (ECCS). Reactors having an active component such as a pump are called "active safety reactors". On the other hand, reactors with a safety system that has a passive component such as a tank are called "passive safety reactors".

Known as a passive safety reactor representing boiling water reactors (BWRs) is the natural circulation cooling type passive safety BWR (ESBWR) (see, for example, IAEA-TECDOC-1391, "Status of advanced light water reactor design 2004," IAEA, May 2004, pp. 207-231; the entire content of which is incorporated herein by reference). Known as a passive safety reactor representing pressurized water reactors (PWRs) is AP1000 (see, for example, IAEA-TECDOC-1391, "Status of advanced light water reactor design 2004," IAEA, May 2004, pp. 279-306; the entire content of which is incorporated herein by reference).

In the ESBWR, the reactor core is contained in the reactor pressure vessel (RPV). The reactor pressure vessel is placed in the dry well (DW). The space above the RPV skirt and the vessel support of the dry well is referred to as "upper DW", and the space below is referred to as "lower DW". Below the upper dry well, a pressure suppression chamber (wet well: WW) is provided. The pressure suppression chamber contains suppression pool water (SP water) and gas phase above the SP water.

The dry well is connected to the suppression pool by twelve LOCA vent pipes. The dry well and the pressure suppression chamber constitute a primary containment vessel (PCV). A gravity-driven cooling system (GDCS) pool is provided in the upper DW.

If a loss-of-coolant accident (LOCA) causing coolant leakage occurs due to a rupture of a coolant pipe of the reactor or other reason, the pressure in the dry well would rise and push water level in LOCA vent pipes to a position of a horizontal vent. In this case, gas in the dry well would enter the suppression pool water. The suppression pool water condenses all steam in the gas, but noncondensable gas such as nitrogen cannot be condensed. The noncondensable gas inevitably flows into the gas phase of the pressure suppression chamber and will accumulate in the gas phase.

As this process proceeds, the dry well will be filled almost with steam. All noncondensable gases, such as nitrogen, that have existed in the dry well flow to the gas phase of the pressure suppression chamber. All driving energy in this process is the pressure of the steam released into the dry well.

The noncondensable gases are compressed in the gas phase of the pressure suppression chamber. As a result, the pressure rises in the pressure suppression chamber. Because this rise of pressure determines the final pressure of the PCV, the free volume ratio between the wet well and the dry well is desired to be more than about 0.6.

If the free volume ratio is as small as 0.1 for example, the pressure in the pressure suppression chamber will reach about 1 MPa (approx. 10 kg/cm$^2$) even if only the compression of the noncondensable gases is taken into account. To maintain the free volume ratio at a large value, efforts have been made to reduce the free volume of the dry well as much as possible in designing the BWR.

In case the free volume of the dry well is very large, the free volume of the wet well should be also large accordingly. Thus, the containment may be irrationally designed as if it had two large dry wells practically. At a LOCA, dry well pressure is kept higher than wet well pressure as much as corresponds to the water head (level) difference between the LOCA vent pipe and the suppression pool. This pressure difference is about 0.05 MPa (0.5 kg/cm2) at most.

Above the dry well, a passive containment cooling system (PCCS) pool is arranged. The PCCS pool has a passive safety function, not using any active component, but utilizing gravity, pressure difference or natural circulation. The PCCS pool holds PCCS pool water. In the PCCS pool, a PCCS heat exchanger is arranged. The PCCS heat exchanger intakes the atmosphere in the dry well through a suction pipe and condenses the steam in the atmosphere. While the steam is being condensed, the noncondensable gases such as nitrogen contained in the atmosphere are guided into the suppression pool water by a PCCS vent pipe.

The condensed water is returned to the GDCS pool through a condensate water return pipe and introduced into the RPV again as ECCS water source. The driving force used when the PCCS intakes the atmosphere in the dry well and guides the noncondensable gases into the suppression pool water is the pressure difference (pressure gradient) maintained between the dry well and the wet well.

The submergence of the PCCS vent pipe in the suppression pool is set higher than that of the horizontal vent of the LOCA vent pipe. Hence, the LOCA vent pipes are no longer used for the condensation of steam, once the rapid blowdown just after the LOCA ends, and after a moderate and stable condensation of steam initiates, only the PCCS heat exchanger is used to condensate steam. Only the PCCS vent pipe is used to vent the noncondensable gases at this stage.

Thus, the PCCS has the function of venting the noncondensable gases into the pressure suppression chamber. Therefore, even if a severe accident occurs, and a large amount of hydrogen is generated, the PCCS is designed to prevent a loss of its passive cooling function due to stagnancy of the hydrogen in the PCCS heat exchanger. Without this function, although the PCCS heat exchanger can initially condense the steam efficiently, noncondensable gases such as hydrogen and nitrogen would be stagnant in the PCCS heat exchanger and it would immediately become unable to intake the steam.

On the contrary, as long as the pressure difference between the dry well and the pressure suppression chamber is kept, this pressure difference can be used as a passive driving force to intake and condense the steam in the dry well without limitation by venting the noncondensable gases at high efficiency. Therefore, if the PCCS heat exchanger and the PCCS pool water are designed to have an appropriate capacity respectively, the PCCS can be used for any water cooled reactor with any containment configuration and reactor thermal power. Namely, the PCCS feasibility depends on whether a pressure suppression chamber can be installed or not, in order to maintain a pressure difference between the nodes. And then, a pressure suppression chamber feasibility further depends on how large a free volume ratio between the wet well and the dry well can be.

FIG. 7 is a vertical cross sectional view of a containment vessel used in a conventional passive safety PWR (AP1000).

In AP1000, the reactor core 1 is contained in a reactor pressure vessel (RPV) 2. The reactor pressure vessel 2 is connected to two steam generators (SGs) 3 by both a cold leg pipe 4 and a hot leg pipe 5. A reactor coolant pump (RCP) 6 is directly attached to the bottom of the steam generator 3. These devices and pipes, which constitute a reactor pressure boundary, are all contained in a containment vessel (CV) 77.

The containment vessel 77 of AP 1000 is a most typical containment vessel, called "large dry CV", for use in PWRs. The containment vessel 77 is made of steel, because it is designed to be cooled with the external air in case of an accident. Most PWR plant other than AP1000 rather use a large dry CV made of prestressed concrete.

In the containment vessel, an in-containment refueling water storage tank (IRWST) 8 is provided. The in-containment refueling water storage tank 8 works as a gravity-driven cooling system if a loss-of-coolant accident occurs due to a rupture of the cold leg pipe 4 or the like. This gravity-driven cooling system cooperates with other passive ECCS to fill the lower part of the containment vessel with water to a higher level than the cold leg pipe.

After that, it is designed that the recirc screen is opened, introducing the water always into the reactor pressure vessel 2 to cool the fuel in the reactor core safely. If the water introduced into the reactor pressure vessel 2 is heated by the decay heat of the fuel in the reactor core, steam is generated and the steam fills the gas phase of the containment vessel 77 resulting in a rise of the temperature and pressure in the containment vessel 77.

A shield building 71 is built outside the containment vessel 77. A cooling water pool 72 of a passive containment cooling system (PCS) is provided on the top of the shield building 71. The cooling water pool 72 is filled with PCS cooling water 73. In case of a LOCA, the PCS cooling water 73 drains onto the containment vessel 77. Air flows into the shield building 71 through a containment cooling air inlet 74 and then a natural circulation force raises the air through the gap between an air baffle 75 and the wall of the containment vessel 77 until the air is released outside through a containment cooling heated air discharge 76 formed at the top of the shield building 71. The drainage of the PCS cooling water 73 and the natural convection of air serve to cool the containment vessel 77 in safety.

In this way, AP1000 can cool the reactor core 1 and the containment vessel 77 with an extremely high reliability only by the passive safety systems requiring no external power source.

Although a rated electric output of AP1000 is about 1,117 MWe, the rated electric power can be easily increased up to about 1,700 MWe by increasing the number of steam generators to three. If the thermal output of the reactor core increases, however, the pressure in the containment vessel will rise at the event of a LOCA.

To mitigate the pressure rise in the containment vessel at a LOCA, the containment vessel may be made a little larger. Further, the containment vessel will become more reliable if a PCCS designed for passive safety BWRs is employed besides conventional functions of air and water cooling for the containment vessel cooling. The PCCS can attain cooling capability as high as necessary, merely by increasing the capacity of the heat exchanger and the amount of cooling water in accordance with the thermal output of the reactor.

In order to employ the PCCS, a pressure suppression chamber need to be provided so that a pressure difference between the nodes may be utilized as a passive driving force for venting noncondensable gases. The large dry CV of the PWR has a free volume as large as about tens of thousands of cubic meters. This volume is about ten times as large as the dry well free volume of the BWR. Therefore, if a pressure suppression chamber having the same volume as that of the BWR is provided, the pressure at an LOCA may reach about 1 MPa (approx. 10 kg/cm$^2$) due to compression of the noncondensable gases to about one-tenth the initial volume of the gases. Consequently, the containment vessel (CV) may be ruptured.

That is, if a PWR tries to have a pressure suppression type containment and have a pressure suppression chamber like a BWR, the containment pressure will rather becomes extremely high. On the contrary, if the large dry CV is designed to withstand such a high pressure, the manufacturing cost will be practically too expensive.

The volume of the dry well of the BWR can be one tenth of the CV volume of the PWR, because the BWR has neither large device such as a steam generator nor large reactor coolant loops and has a few pressure boundary components that should be contained. On the contrary, in the PWR, the number of required steam generates increases in proportion to the thermal output. Therefore, the containment vessel of, for example, a recent four-loop PWR plant has a free volume of as much as about 80,000 m$^3$. In such a large power four-loop PWR plant, passive cooling of the containment vessel can hardly be achieved.

BRIEF SUMMARY OF THE INVENTION

The present invention has been made to solve the above problems, and an object of this invention is to install a pressure suppression chamber in a large nuclear power plant having a pressurized water reactor.

According to an aspect of the present invention, there is provided a containment vessel for containing a steam generator and a reactor pressure vessel that contains a reactor core of a pressurized water reactor, the containment vessel comprising: a main body; a diaphragm partitioning the main body into a first space and a second space, the second space containing an equipment and piping constituting a reactor pressure boundary, the equipment and piping including the reactor pressure vessel and the steam generator; a pressure suppression chamber having a suppression pool and a gas phase, the suppression pool being configured to store water, the gas phase communicating with the first section; and a LOCA vent pipe connecting the suppression pool to the second space.

According to another aspect of the present invention, there is provided a nuclear power plant having a pressurized water reactor, the plant comprising: a containment vessel including: a main body; a diaphragm partitioning the main body into a first space and a second space; a pressure suppression chamber having a suppression pool and a gas phase, the suppression pool being configured to store water, the gas phase communicating with the first section; and a LOCA vent pipe connecting the suppression pool to the second space; and an equipment and piping constituting a reactor pressure boundary, the equipment and piping being contained in the second space and including the reactor pressure vessel and the steam generator.

BRIEF DESCRIPTION OF THE DRAWINGS

The above and other features and advantage of the present invention will become apparent from the discussion herein below of specific, illustrative embodiments thereof presented in conjunction with accompanying drawings, in which.

DETAILED DESCRIPTION OF THE INVENTION

Hereinafter, embodiments of a containment vessel according to the present invention will be described with reference to the drawings. The same symbols are given to same or similar configurations, and duplicated descriptions may be omitted.

First Embodiment

Figure 1:
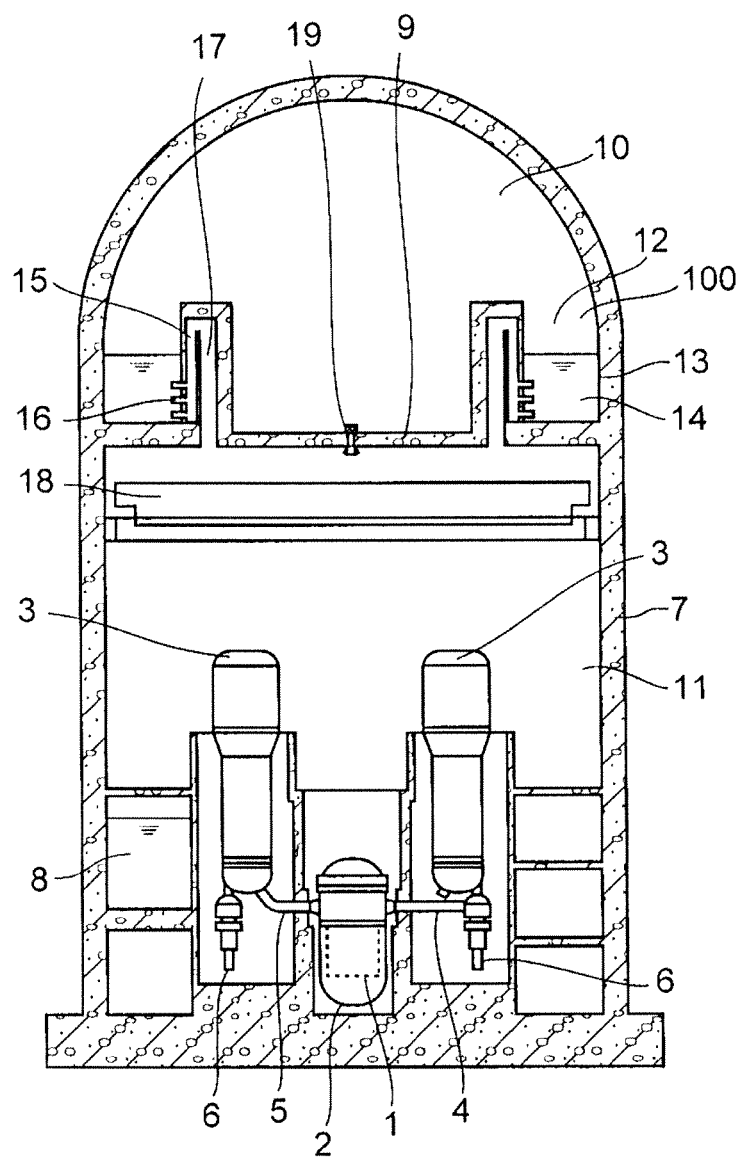
FIG. 1 is a vertical cross sectional view of a containment vessel according to a first embodiment of the present invention.

FIG. 1 is a vertical cross sectional view of a containment vessel according to a first embodiment of the present invention.

A nuclear power plant having a pressurized water reactor has a reactor core 1 and a reactor pressure vessel 2 containing the reactor core 1. The reactor pressure vessel 2 is connected to, for example, two steam generators 3 with both cold leg pipe 4 and hot leg pipe 5. A reactor coolant pump 6 that circulates a reactor coolant through the reactor core 1 and the steam generators 3 is attached directly to a bottom of the steam generators 3, for example. These equipment and piping constitute a reactor pressure boundary. The containment vessel of the pressurized water reactor contains the equipment and piping constituting the reactor pressure boundary.

The containment vessel according to this embodiment has a main containment vessel (MCV) 7 and a diaphragm 9. The main containment vessel 7 is made of reinforced concrete and is composed of a flat disk, a hollow cylinder mounted on the flat disk and a semispherical cover covering the top of the hollow cylinder. The diaphragm 9 is expanding horizontally, for example.

The diaphragm 9 partitions the main containment vessel 7 into a first space and a second space. Hereinafter, the first space shall be referred to as "upper vessel 10" and the second space shall be referred to as "lower vessel 11". In this embodiment, the upper vessel 10 is located higher than the lower vessel 11. A vacuum breaker 19 that opens when the pressure difference between the upper vessel 10 and the lower vessel 11 exceeds a preset value may be provided on the diaphragm 9. All of the equipment and piping that constitute the reactor pressure boundary are contained in the lower vessel 11.

A pressure suppression chamber 12 is provided in the containment vessel. The pressure suppression chamber 12 has a suppression pool 13. The suppression pool 13 is formed to store water and stores suppression pool water 14 to water level of, for example, 5 m or more in a normal state. The suppression pool water 14 is, for example, borated water. In this embodiment, the pressure suppression chamber 12 is provided in the upper vessel 10. The pressure suppression chamber 12 opens at, for example, the top, and communicates with the other part of the upper vessel 10. A gas phase 100 is formed above the suppression pool 13 in the suppression chamber 12.

In the containment vessel, LOCA vent pipes 15 connecting the lower vessel 11 and the suppression pool 13 are provided. At the conjunction between the LOCA vent pipes 15 and the suppression pool 13, horizontal vents 16 that extend horizontally may be provided.

The LOCA vent pipes 15 and the horizontal vents 16 may have the same shape as those for BWRs. Since the lower vessel 11 is connected to the LOCA vent pipes 15, a riser section 17, that is a circular part of the diaphragm 9 extending upward to a higher level than the level of the suppression pool water 14, is formed.

The number of the LOCA vent pipes 15 ranges from about 10 to about 50 and may be changed as needed. Since the containment vessel of the PWR has an inside diameter as large as about 45 m and the circumference length along the LOCA vent pipes 15 is about 100 m, no problems arise in installing up to about 50 vent pipes. In practice, because the volume of the lower vessel 11 is large enough, the pressure rise (primary peak) occurring immediately after a loss-of-coolant accident (LOCA) is not so large and the number of vent pipes can be reduced to about 10.

The in-containment refueling water storage tank 8 is provided in the main containment vessel 7. If a LOCA occurs because of a rupture of the cold leg pipe 4, etc., the in-containment refueling water storage tank 8 works as gravity-driven cooling system and, cooperating with other passive ECCS, submerges the lower part of the containment vessel to a level above the cold leg pipe 4. After that, it is designed that the recirc screen is opened, introducing the water always into the reactor pressure vessel 2 to cool the fuel in the reactor core safely. The water introduced into the reactor pressure vessel 2 is heated by the decay heat of the fuel in the reactor core, steam is generated and the steam fills the gas phase of the main containment vessel 7 resulting in a rise of the temperature and pressure in the containment vessel 7.

A vertical position of the diaphragm 9 is set that all of the components arranged below a polar crane 18 can be contained in the lower vessel 11. If a free volume of the main containment vessel 7 is about 80,000 $m^3$, a free volume of the lower vessel 11 is designed to be about 50,000 $m^3$ and a free volume of the upper vessel 10 is designed to be about 30,000 $m^3$. In this case, the free volume ratio can be about 0.6.

If the free volume ratio is about 0.6, the pressure rise resulting from the compression of the noncondensable gases in the upper vessel 10 can be suppressed as sufficiently low as about 0.265 MPa (1.67 $kgf/cm^2$ g) in case of a design basis accident. Even in case of a severe accident that causes a generation of a great amount of hydrogen, the pressure rise is as low as about 0.35 MPa (2.5 $kgf/cm^2$ g).

Thus, introduction of the containment vessel according to this embodiment enables that the pressure suppression chamber 12 can be installed even in a nuclear power plant having a large pressurized water reactor of, for example, 1,700 MWe class. This is because the diaphragm 9 partitions the conventional large-dry type containment vessel to provide a large space, such as dome part, that is used substantially as the gas phase of the pressure suppression chamber 12.

Figure 2:
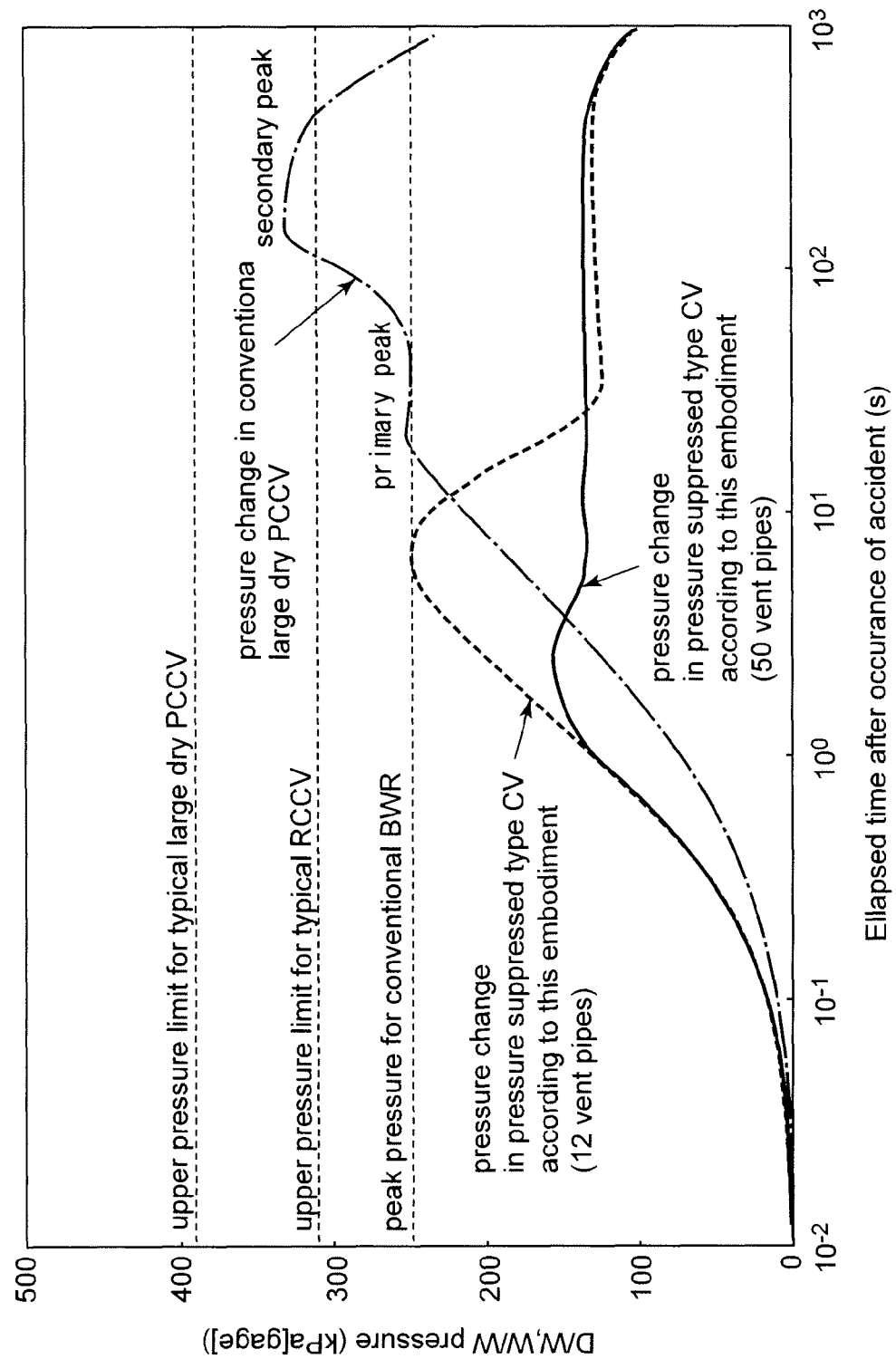
FIG. 2 is a graph showing the pressure changes in case of a LOCA according to this embodiment.

FIG. 2 is a graph showing the pressure changes in case of a LOCA according to this embodiment. The graph is based on the assumption that the number of the LOCA vent pipes 15 is twelve or fifty. FIG. 2 also shows, for comparison, the pressure changes in a large-dry type containment vessel in case of LOCA.

As seen from FIG. 2, the pressure in the containment vessel according to this embodiment is sufficiently low in case of a LOCA. Even in the case that the number of the LOCA vent pipes 15 is reduced to twelve, the pressure in the containment vessel is suppressed to the same level as the peak pressure of the conventional BWR. In the case that the number of the LOCA vent pipes 15 is fifty, the pressure is suppressed and the primary peak immediately after the LOCA is hardly observed. Therefore, the main containment vessel 7 can be made of steel, prestressed concrete or reinforced concrete.

In the PWR having a conventional large-dry type containment vessel, the secondary peak pressure may be too high to exceed the maximum pressure for a typical RCCV. Therefore, the material of the typical large-dry type containment vessel is limited to steel or prestressed concrete.

Figure 7:
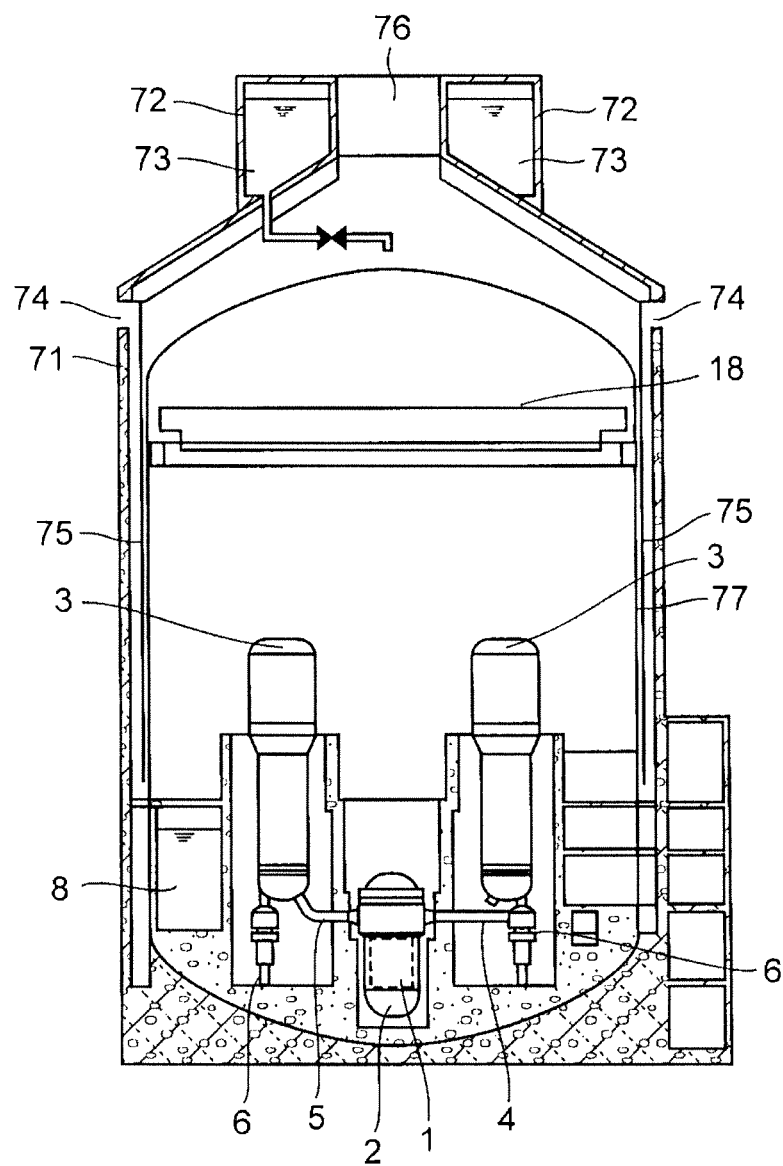
FIG. 7 is a vertical cross sectional view of a containment vessel used in a conventional passive safety PWR (AP1000).

In a relatively small nuclear power plant for example, the main containment vessel 7 can be made of steel. In this case, the shield building (see FIG. 7) is installed outside the main containment vessel 7. However, the main containment vessel 7 cannot be so large if it is made of steel. So the main containment vessel 7 for a pressurized water reactor of 1,700 MWe class is made of prestressed concrete, for example.

The prestressed concrete CV (PCCV), however, always needs to be fastened with tendons and it is a burden to maintain the PCCV. Further, fastening force of the tendons weakens the PCCV against external forces and the PCCV by itself may not withstand a large commercial airplane crash. In this case, the PCCV can be doubly protected by a surrounding protection building made of reinforced concrete, though it is not desirable from an economical point of view.

In the containment vessel according to this embodiment, because the pressure suppression chamber 12 can suppress the pressure during the LOCA, the reinforced concrete containment vessel (RCCV) that is rationally made of reinforced concrete and of which design basis pressure is low can be adopted. If the RCCV including the dome part have a wall thickness of 2 m or more, it can well withstand a large commercial airplane crash by itself. In addition, the RCCV need not be surrounded doubly by a shield building, because its shielding ability is high and it can be designed very rationally. Moreover, the RCCV has an advantage of high resistance against earthquake.

A drain pipe extending from the suppression pool 13 to the lower vessel 11 may be provided. In this case, the suppression pool water 14 can be used as water source to be drained into the lower vessel 11 in case of an accident, if the suppression pool water 14 is borated water.

Furthermore, water supply piping extending from the suppression pool 13 to the reactor pressure vessel 2 may be provided. In this case, the gravity-driven cooling system can supply the suppression pool water 14 into the reactor pressure vessel 2 in case of an accident, if the suppression pool water 14 is borated water, too.

Because the diaphragm 9 isolates the upper vessel 10 from the lower vessel 11, the upper vessel 10 can be inerted with nitrogen atmosphere to keep the oxygen concentration low. Thus, hydrogen detonation can be prevented almost perfectly even if hydrogen gas is generated from the oxidation of the fuel in the reactor core at a severe accident and vented into the upper vessel 10, raising the hydrogen concentration over the inflammable limit.

On the other hand, because an ordinary air atmosphere remains in the lower vessel 11, an operator can enter there to check the integrity of the components during a normal operation. If a great amount of hydrogen is generated in an accident, the possibility of hydrogen detonation is extremely small because the lower vessel 11 has a volume as large as about 50,000 $m^3$ and the great amount of steam reduces the hydrogen concentration.

The hydrogen concentration increases when the steam condenses in the suppression pool 13, but a possibility of hydrogen detonation is extremely small because the oxygen concentration in the atmosphere is kept low in the upper vessel 10 as mentioned above.

Introduction of the vacuum breaker 19 on the diaphragm 9 enables to equalize the pressures of the upper vessel 10 and the lower vessel 11 even if the steam remaining in the lower vessel 11 abruptly condenses for some reason. At this point, also, because the atmosphere of which a hydrogen concentration is reduced below the detonation limit flows into the lower vessel 11, the possibility of hydrogen detonation is extremely small.

Second Embodiment

Figure 3:
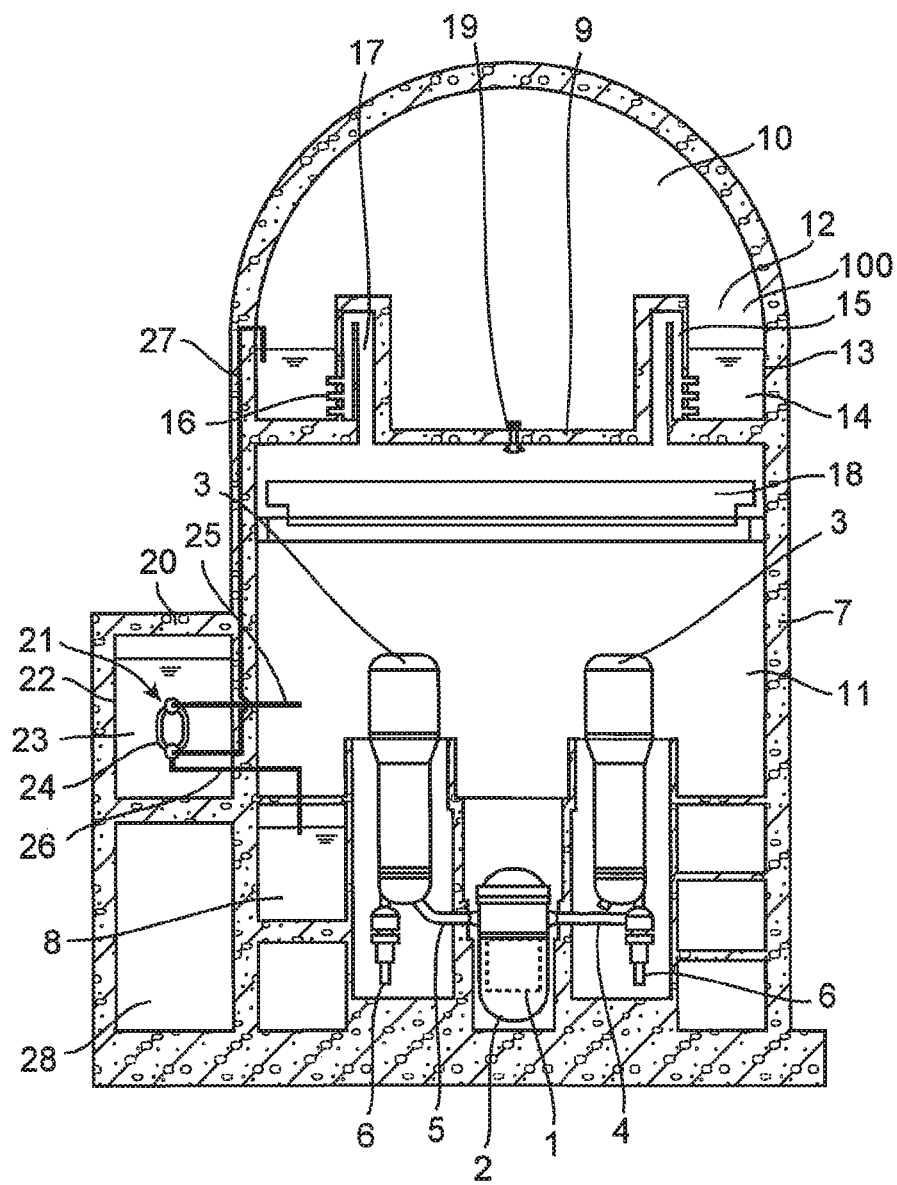
FIG. 3 is a vertical cross sectional view of a containment vessel according to a second embodiment of the present invention.

FIG. 3 is a vertical cross sectional view of a containment vessel according to a second embodiment of the present invention.

The containment vessel according to this embodiment is provided with a passive containment cooling system building (PCCS) 20 outside the main containment vessel 7 for installing a passive containment cooling system 21. The passive containment cooling system 21 has a PCCS pool 22 provided in the PCCS building 20 and a PCCS heat exchanger 24. The PCCS pool 22 is configured to store PCCS pool water 23. The PCCS heat exchanger 24 is placed to be submerged in the PCCS pool water 23. The PCCS heat exchanger 24 is connected to a suction pipe 25 of which end opens to the lower vessel 11. The PCCS heat exchanger 24 is also connected to a return pipe 26 that returns the condensed water back into the lower vessel 11. Further, a PCCS vent pipe 27 through which the noncondensable gas that is not condensed in the PCCS heat exchanger 24 to the upper vessel 10 is provided.

As in the first embodiment, the diaphragm 9 partitions the containment vessel to provide a large space, such as dome part, that is utilized substantially as the gas phase of the pressure suppression chamber 12. Thus, the pressure suppression chamber 12 can be installed even in a nuclear power plant having a large scale pressurized water reactor of 1,700 MWe class.

In case of an accident such as a LOCA, the steam introduced into the lower vessel 11 is guided, together with the noncondensable gases, into the PCCS heat exchanger 24 because of the pressure difference between nodes. Since the suction pipe 25 remains open all time, no operation of opening a valve after the accident is required at all.

The opening of the suction pipe 25 may be at any position in the lower vessel 11 as long as it is above the water level of the submerged lower vessel 11 in case of an accident. The higher the position of the suction pipe 25, the more readily can hydrogen that is likely to accumulate in the upper part be drawn. On the other hand, the lower the position of the suction pipe 25, the more readily can nitrogen and oxygen be drawn, though the difference is very small.

The steam condensed in the PCCS heat exchanger 24 flows back into the lower vessel 11 through the return pipe 26, by gravity, and is utilized as a water source of the passive ECCS, such as an in-containment refueling water storage tank 8. The noncondensable gases, such as nitrogen and hydrogen, that are not condensed in the PCCS heat exchanger 24 are vented through the PCCS vent pipe 27 into the suppression pool 13 provided in the upper vessel 10.

The PCCS vent pipe 27 according to this embodiment is embedded in the wall of the main containment vessel 7 from a viewpoint of arrangement efficiency. Nonetheless, the PCCS vent pipe 27 may extend inside or outside of the main containment vessel 7.

In spite of the height of the PCCS vent pipe 27 is about 30 m, the noncondensable gas can be smoothly vented because a pressure difference between the upper vessel 10 and the lower vessel 11 is always maintained. That is, the energy released into the lower vessel 11 in an accident is used in the form of pressure difference, and the noncondensable gases can be expelled without using any other driving force.

Since the condensed water is sent back to the lower vessel 11 by the gravity, the PCCS pool 22 and the PCCS heat exchanger 24 must be located at high positions to some extent. Therefore, the PCCS pool 22 and the PCCS heat exchanger 24 are provided above a fuel pool building 28, for example. In this case, the PCCS building 20 and the fuel pool building 28 can be integrated.

The PCCS pool 22 need not be so resistant to pressure, and the PCCS pool 22 is open, in part, to the external air, so that the generated steam may be vented. Although the PCCS building 20 that has a safety function needs to have a countermeasure against airplane crashes and to be designed as earthquake-resistant, it is not necessary to be designed as pressure-resistant, unlike the main containment vessel 7. It means that the PCCS building 20 and the fuel pool building 28 are designed on almost the same conditions, and an integration of them increases the efficiency. Of course, no problems will arise if the PCCS building 20 and the fuel pool building 28 are provided as independent from each other. In this case, the lower part of the PCCS building can be used to contain, for example, an active ECCS.

Third Embodiment

Figure 4:
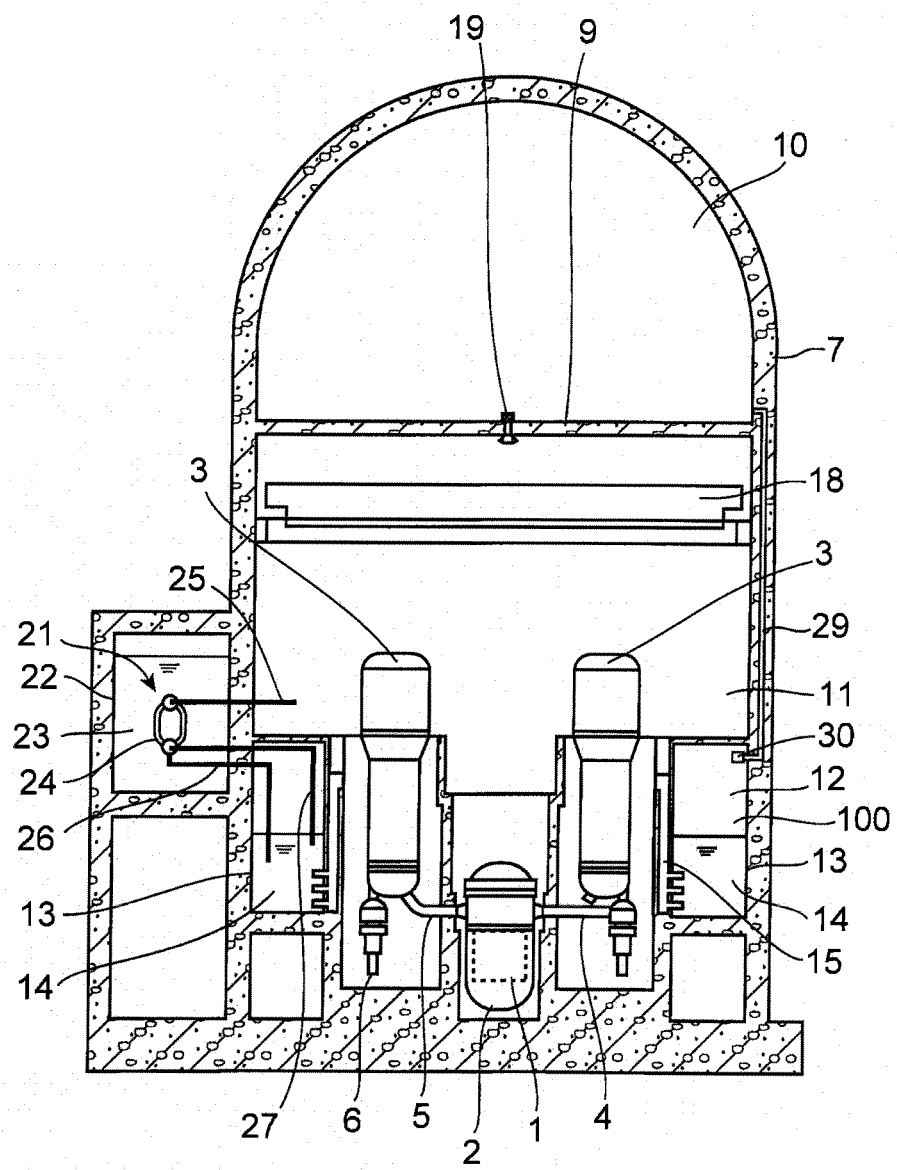
FIG. 4 is a vertical cross sectional view of a containment vessel according to a third embodiment of the present invention.

FIG. 4 is a vertical cross sectional view of a containment vessel according to a third embodiment of the present invention.

In the containment vessel according to this embodiment, the pressure suppression chamber 12 is provided in the lower vessel 11. The pressure suppression chamber 12 is positioned so that the level of the suppression pool water 14 stored in the suppression pool 13 is higher than the cold leg pipe 4. The aim that it is positioned higher than the cold leg piping pipe is to use the suppression pool water 14 as water source for the gravity-driven cooling system so that the water may flow into the reactor pressure vessel 2 by the gravity.

A gas phase vent pipe 29 connects the gas phase of the pressure suppression chamber 12 to the upper vessel 10. In this embodiment, the gas phase vent pipe 29 is embedded in the wall of the main containment vessel 7 to achieve high efficiency of arrangement, however, the gas phase vent pipe 29 may extend inside or outside of the main containment vessel 7. Anyway, the gas phase vent pipe 29 prevents that the noncondensable gas is accumulated and compressed in the gas phase of the pressure suppression chamber 12.

In this embodiment, the diaphragm 9 partitions the containment vessel to provide a large space, and this large space (upper vessel 10) communicates with the pressure suppression chamber 12 through the gas phase vent pipe 29. The interior of the upper vessel 10 is therefore utilized substantially as the gas phase of the pressure suppression chamber 12. Thus, the pressure suppression chamber 12 can be installed even in a large scale nuclear power plant having a pressurized water reactor of 1,700 MWe class.

A large amount of nitrogen existing in atmosphere of lower vessel 11 before an accident and a large amount of hydrogen possibly generated in the lower vessel 11 after the accident are vented into the suppression pool 13 through the LOCA vent pipes 15 by the pressure of the steam.

Since the lower vessel 11 contains other large components such as steam generators 3, the arrangement of the pressure suppression chamber 12 provided in the lower vessel 11 is limited. Therefore, the gas phase of the pressure suppression chamber 12 cannot have a large volume. However in this embodiment, because the noncondensable gas can be vented into the large space in the upper vessel 10 through the gas phase vent pipe 29, it can almost be prevented that the noncondensable gas is compressed in the gas phase of the pressure suppression chamber 12.

A rupture disk 30 may be provided on the gas phase vent pipe 29. The position of the rupture disk 30 may be at the entrance of the gas phase vent pipe 29, for example. In normal operation, this rupture disk 30 isolates the gas phase of the pressure suppression chamber 12 from the upper vessel 10. Therefore, it can be prevented that the upper vessel 10 is contaminated even if a part of reactor water is released into the pressure suppression chamber 12 and a small amount of radioactivity is released during an abnormal transient event. The rupture disk 30 is, however, not indispensable since operators merely steps into the upper vessel 10.

If the suppression pool water 14 is borated, it can be used as water for a refueling and water source for the gravity-driven cooling system. In this case, the in-containment refueling water storage tank 8 need not be provided independently. Moreover, to provide the passive containment cooling system 21 enables to cool the containment vessel in case of accident with high reliability.

Assuming that the temperature of the suppression pool water 14 is suppressed at 100 degree-C., the partial pressure of steam is about 0.1 MPa (1 kgf/cm$^2$). Assuming 120 degree-C., it is about 0.2 MPa (2 kgf/cm$^2$), and the pressure in the containment vessel will increase in proportion. Thus, for the passive cooling of the main containment vessel 7 by means of the PCCS 21, it is very important to lower the temperature of the suppression pool water 14. This is why the return pipe 26 is arranged to supply the condensed water back to the suppression pool 13. This arrangement enables to prevent the suppression pool water 14 from being heated to high temperatures. Further, the arrangement lowers the partial pressure of the steam, and lowers the pressure in the containment vessel in case of accident. In addition, the condensed water can be utilized as water source for the passive ECCS.

Fourth Embodiment

Figure 5:
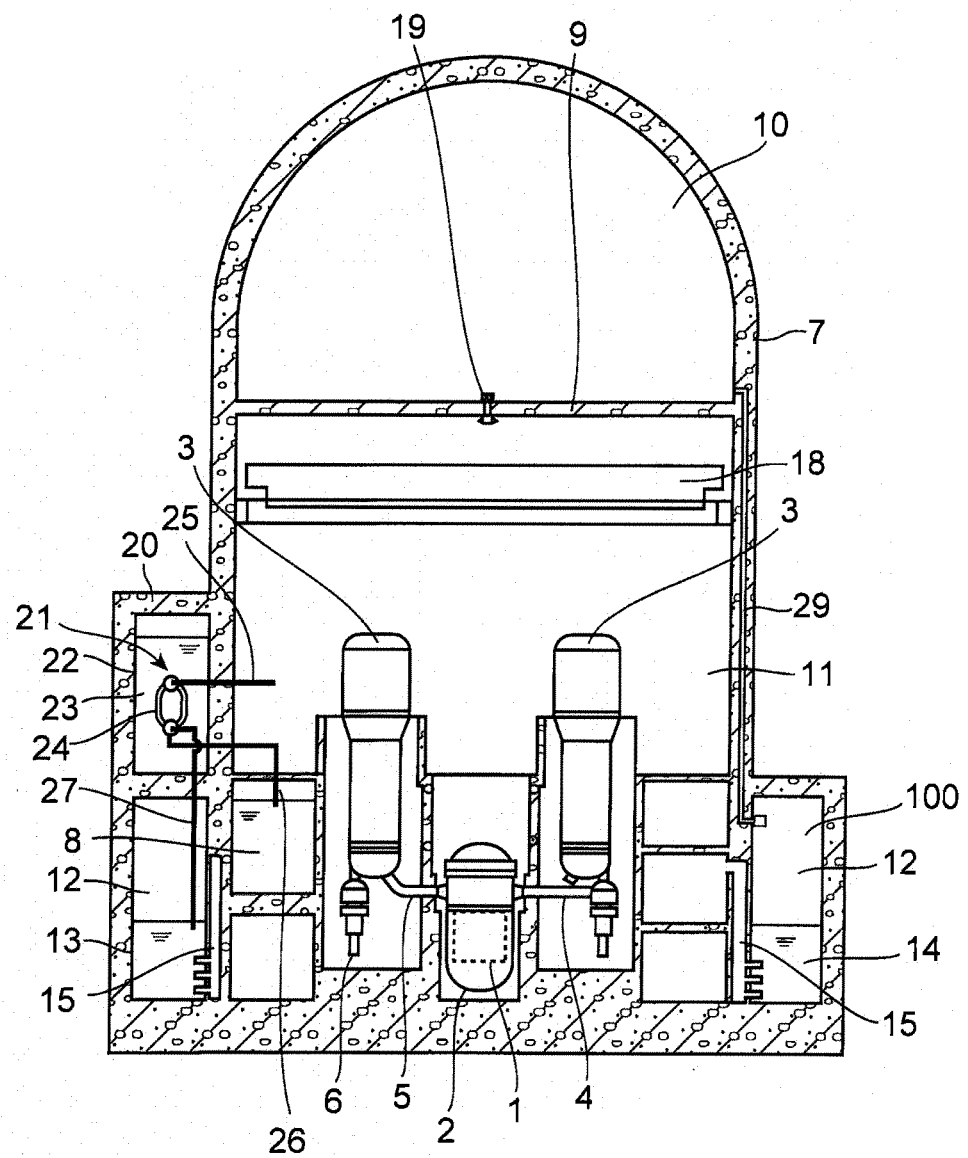
FIG. 5 is a vertical cross sectional view of a containment vessel according to a fourth embodiment of the present invention.

FIG. 5 is a vertical cross sectional view of a containment vessel according to a fourth embodiment of the present invention.

In the containment vessel according to this embodiment, the pressure suppression chamber 12 is provided outside the lower vessel 11. The pressure suppression chamber 12 may be arranged to surround the entire circumference of the main containment vessel or only a part of the circumference depending the number of the required LOCA vent pipes 15. The lower vessel 11 communicates with the suppression pool 13 through the LOCA vent pipes 15. The gas phase of the pressure suppression chamber 12 communicates with the upper vessel 10 through the gas phase vent pipe 29. If the pressure suppression chamber 12 is provided outside the main containment vessel 7 like this, no influence on the arrangement of components in the main containment vessel 7 is imposed.

In this embodiment, the diaphragm 9 partitions the containment vessel to provide a large space, and this large space (upper vessel 10) communicates with the pressure suppression chamber 12 through the gas phase vent pipe 29. The interior of the upper vessel 10 is therefore utilized substantially as gas phase of the pressure suppression chamber 12. Thus, the pressure suppression chamber 12 can be installed even in a large scale nuclear power plant having a pressurized water reactor of 1,700 MWe class.

Also in this embodiment, the PCCS building 20 is constructed above and integrated with the pressure suppression chamber 12. Inside of the PCCS building 20, the passive containment cooling system 21 is provided and cooling of the containment vessel in case of accident can be performed with high reliability.

Fifth Embodiment

Figure 6:
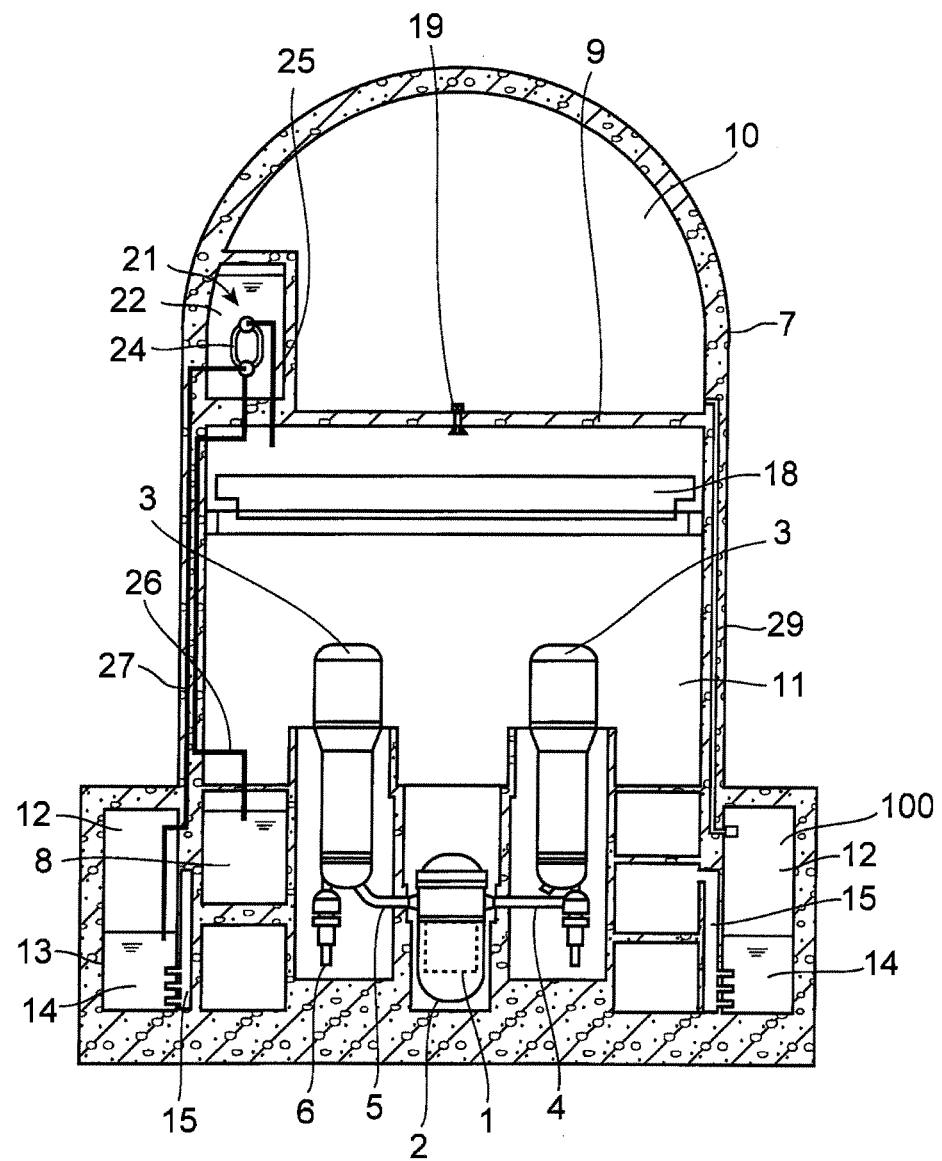
FIG. 6 is a vertical cross sectional view of a containment vessel according to a fifth embodiment of the present invention.

FIG. 6 is a vertical cross sectional view of a containment vessel according to a fifth embodiment of the present invention.

The containment vessel according to this embodiment differs from the fourth embodiment in the positions of the PCCS pool 22 and the PCCS heat exchanger 24. In this embodiment, the passive containment cooling system pool 22 and the PCCS heat exchanger 24 are located in the upper vessel 10.

In the upper vessel 10, because no other large components are installed and some room for installation is left, arranging these components increases the arrangement efficiency very much. Since the passive containment cooling system 21 that has an important safety function, to provide it in the main containment vessel 7 that is firmly protected against airplane crashes enhances the safety of plant. Though an example that the PCCS pool 22 and the PCCS heat exchanger 24 are arranged in the upper vessel 10 is illustrated in this embodiment, to arrange them in the lower vessel 11 if a space permits also brings a similar advantage against airplane crashes.

In this embodiment, the diaphragm 9 partitions the containment vessel to provide a large space, and this large space (upper vessel 10) communicates with the pressure suppression chamber 12 through the gas phase vent pipe 29. The interior of the upper vessel 10 is therefore utilized substantially as gas phase of the pressure suppression chamber 12. Thus, the pressure suppression chamber 12 can be installed even in a large scale nuclear power plant having a pressurized water reactor of 1,700 MWe class.

Other Embodiments

Above mentioned embodiments are just examples, and the present invention is not limited to these. Also each feature of the embodiments can be combined together.

What is claimed is:

1. A containment vessel for containing a reactor pressure vessel, a reactor core, and a steam generator of a pressurized water reactor, the containment vessel comprising:
   a main body equipped with a polar crane;
   a diaphragm set above the polar crane,
      wherein the diaphragm partitions the main body into an upper vessel and a lower vessel,
      wherein the diaphragm is configured to provide the partition before and after a loss-of-coolant accident (LOCA),
      the upper vessel being located higher than the lower vessel,
         the upper vessel including a dome part thereof, wherein an open space is in the dome part,
      the lower vessel being configured to contain all of an equipment and piping constituting a reactor pressure boundary,
         the equipment and piping including the reactor pressure vessel and the steam generator of the pressurized water reactor,
      wherein the diaphragm isolates the upper vessel from the lower vessel;
   a pressure suppression chamber having a suppression pool and a gas phase,
      the suppression pool being configured to store water,
      the gas phase of the pressure suppression chamber is in fluid communication with the open space in the dome part;
   a LOCA vent pipe fluidly connecting the suppression pool to the lower vessel; and
   a vacuum breaker configured to equalize a pressure of the upper vessel and a pressure of the lower vessel,
      the vacuum breaker is configured to open and allow gas flow from the upper vessel to the lower vessel when a pressure difference between the upper vessel and the lower vessel exceeds a preset value.

2. The containment vessel of claim 1, wherein the pressure suppression chamber is provided in the upper vessel.

3. The containment vessel of claim 1, wherein the pressure suppression chamber is provided in the lower vessel, and further comprising a gas phase vent pipe connecting the gas phase to the upper vessel.

4. The containment vessel of claim 1, wherein the pressure suppression chamber is provided outside the main body, and further comprising a gas phase vent pipe connecting the gas phase to the upper vessel.

5. The containment vessel of claim 1, wherein atmosphere in the pressure suppression chamber is inerted with nitrogen to make an oxygen concentration low.

6. The containment vessel of claim 1, wherein atmosphere in the upper vessel is inerted with nitrogen to make an oxygen concentration low.

7. The containment vessel of claim 1, wherein the suppression pool stores borated water.

8. The containment vessel of claim 1, further comprising:
   a passive containment cooling system (PCCS) pool configured to store water;
   a PCCS heat exchanger located in the PCCS pool;
   a suction pipe extending from the lower vessel to the PCCS heat exchanger;
   a PCCS vent pipe extending from the PCCS heat exchanger to the suppression pool, the PCCS vent pipe being configured to discharge noncondensable gas therethrough, the noncondensable gas comprising a part of gas being introduced through the suction pipe; and a return pipe being configured to supply water condensed by the PCCS heat exchanger back to the lower vessel.

9. The containment vessel of claim 8, wherein the PCCS pool is located outside the main body.

10. The containment vessel of claim 8, wherein the PCCS pool is located in the main body.

11. The containment vessel of claim 1, wherein the main body is made of one of prestressed concrete and reinforced concrete.

12. The containment vessel of claim 1, wherein the main body is made of steel.

13. A nuclear power plant having a pressurized water reactor, the nuclear power plant comprising: a containment vessel including:
 a main body equipped with a polar crane;
 a diaphragm set above the polar crane,
  wherein the diaphragm partitions the main body into an upper vessel and a lower vessel,
   wherein the diaphragm is configured to provide the partition before and after a loss-of-coolant accident (LOCA),
  the upper vessel being located higher than the lower vessel,
   the upper vessel including a dome part thereof,
    wherein an open space is in the dome part,
  the lower vessel being configured to contain all of an equipment and piping constituting a reactor pressure boundary,
   the equipment and piping including the reactor pressure vessel and the steam generator of the pressurized water reactor,
  wherein the diaphragm isolates the upper vessel from the lower vessel;
 a pressure suppression chamber having a suppression pool and a gas phase,
  the suppression pool being configured to store water,
  the gas phase of the pressure suppression chamber is in fluid communication with the open space in the dome part;
 a LOCA vent pipe fluidly connecting the suppression pool to the lower vessel; and
 a vacuum breaker configured to equalize a pressure of the upper vessel and a pressure of the lower vessel,
  the vacuum breaker is configured to open and allow gas flow from the upper vessel to the lower vessel when a pressure difference between the upper vessel and the lower vessel exceeds a preset value.

14. The nuclear power plant of claim 13, wherein atmosphere in the upper vessel is inerted with nitrogen to make an oxygen concentration low.

* * * * *